United States Patent
Fujita

(10) Patent No.: US 11,251,444 B2
(45) Date of Patent: Feb. 15, 2022

(54) GAS SUPPLY SYSTEM

(71) Applicant: TOYOTA JIDOSHA KABUSHIKI KAISHA, Toyota (JP)

(72) Inventor: Keisuke Fujita, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 429 days.

(21) Appl. No.: 15/888,480

(22) Filed: Feb. 5, 2018

(65) Prior Publication Data

US 2018/0233756 A1      Aug. 16, 2018

(30) Foreign Application Priority Data

Feb. 10, 2017 (JP) .............................. JP2017-022658

(51) Int. Cl.
| | |
|---|---|
| H01M 8/04089 | (2016.01) |
| H01M 8/04082 | (2016.01) |
| H01M 8/04223 | (2016.01) |
| H01M 8/04746 | (2016.01) |
| H01M 8/0438 | (2016.01) |

(52) U.S. Cl.
CPC ... *H01M 8/04104* (2013.01); *H01M 8/04201* (2013.01); *H01M 8/04231* (2013.01); *H01M 8/04388* (2013.01); *H01M 8/04753* (2013.01)

(58) Field of Classification Search
CPC ......... H01M 8/04201; H01M 8/04388; H01M 8/04753
See application file for complete search history.

(56) References Cited

U.S. PATENT DOCUMENTS

| | | | |
|---|---|---|---|
| 2006/0051636 A1* | 3/2006 | Kubo | H01M 8/2484 429/429 |
| 2012/0060583 A1* | 3/2012 | Pechtold | F17C 13/025 73/1.57 |

FOREIGN PATENT DOCUMENTS

| | | |
|---|---|---|
| JP | 2000-12062 | 1/2000 |
| JP | 2011-204411 | 10/2011 |
| JP | 2013-93141 | 5/2013 |
| JP | 2013-177910 | 9/2013 |

* cited by examiner

*Primary Examiner* — Stephan J Essex
(74) *Attorney, Agent, or Firm* — Finnegan, Henderson, Farabow, Garrett & Dunner, LLP

(57) ABSTRACT

A shutoff valve, a first gas pressure sensor, a pressure reducing valve, a second gas pressure sensor, and a gas supply component are provided, sequentially from a gas tank side, in a gas supply flow channel that extends from the gas tank to a gas consuming component. Besides, a buffer tank is provided, via an on-off valve, in a branch flow channel that branches off from the gas supply flow channel between the pressure reducing valve and the gas supply component. This buffer tank is in a situation where the pressure of the buffer tank is not higher than a consumption prescribed gas pressure. In calibrating the first gas pressure sensor, with the shutoff valve closed and with the on-off valve open, a detection value of the first gas pressure sensor is calibrated through the use of a detection value of the second gas pressure sensor.

5 Claims, 3 Drawing Sheets

GAS SUPPLY SYSTEM

INCORPORATION BY REFERENCE

The disclosure of Japanese Patent Application No. 2017-022658 filed on Feb. 10, 2017 including the specification, drawings and abstract is incorporated herein by reference in its entirety.

BACKGROUND

1. Technical Field

The present disclosure relates to a gas supply system.

2. Description of Related Art

A gas supply system stores fuel gas of a gas consuming component, for example, hydrogen gas as fuel gas of a fuel cell into a gas tank at a high pressure, and supplies the stored hydrogen gas to an anode of the fuel cell. Then, with a view to calibrating a sensor detection value required for the detection of an amount of the gas remaining in the gas tank, there is proposed a method of calibrating a detection value of a high-pressure sensor that is provided upstream of a pressure reducing valve in a gas supply flow channel, with a detection value of a low-pressure sensor that is provided downstream of the pressure reducing valve (e.g., Japanese Patent Application Publication No. 2013-177910 (JP 2013-177910 A)). Then, according to this method of detecting the remaining amount of gas as proposed in JP 2013-177910 A, a process of calibrating the detection value of the high-pressure sensor is carried out while the gas in the flow channel downstream of a shutoff valve downstream of the gas tank is supplied to a gas receiving unit, with the shutoff valve closed.

SUMMARY

In the aforementioned JP 2013-177910 A, the fuel cell is used as the gas receiving unit to which the gas in the flow channel downstream of the shutoff valve in its closed state is supplied. Hydrogen gas is supplied to the anode of this fuel cell during the process of calibrating the sensor detection value. In consequence, despite a situation where electric power generation is stopped with the shutoff valve closed, the operation of the fuel cell is continued by the hydrogen in the hydrogen gas supplied to the anode and the oxygen remaining in a cathode. On the other hand, under the situation where electric power generation is stopped, no electric power or only a minute quantity of electric power is fed from the fuel cell, so the fuel cell operates sluggishly. In consequence, the pressure of the hydrogen gas in the flow channel downstream of the shutoff valve in its closed state also falls sluggishly, and the fall in the sensor detection value does not progress correspondingly. Besides, there is an apprehension that the operation duration time of the fuel cell may become long, and that the operation sound resulting from the operation of the fuel cell may become noise. Incidentally, the aforementioned JP 2013-177910 A indicates that an accumulator separate from the fuel cell can be used as the gas receiving unit, but does not disclose how to use the accumulator in place of the fuel cell. For these reasons, there have been demands to swiftly carry out calibration of the detection value of the gas pressure sensor.

The present disclosure can be realized in the following modes.

According to one of the modes of the present disclosure, there is provided a gas supply system. This gas supply system supplies a fuel gas to a gas consuming component. The gas supply system is equipped with a gas supply flow channel, a pressure reducing valve, a shutoff valve, a first gas pressure sensor, a second gas pressure sensor, a gas supply component, a branch flow channel, a buffer tank, and a control unit. The gas supply flow channel extends from a gas tank storing the fuel gas to the gas consuming component. The pressure reducing valve is provided in the gas supply flow channel, and is configured to reduce a pressure of gas passing through the gas supply flow channel. The shutoff valve is configured to shut off a flow channel upstream of the pressure reducing valve. The first gas pressure sensor is configured to detect a pressure of gas upstream of the pressure reducing valve. The second gas pressure sensor is configured to detect a pressure of gas downstream of the pressure reducing valve. The gas supply component is configured to supply the fuel gas to the gas consuming component from the gas supply flow channel. The branch flow channel branches off from the gas supply flow channel between the gas supply component and the pressure reducing valve. The buffer tank is connected to the branch flow channel via an on-off valve configured to open and close the flow channel, and is not in a situation where a pressure of the buffer tank is higher than a consumption prescribed gas pressure that is prescribed when the fuel gas is consumed in the gas consuming component. The control unit is configured to receive gas pressure detection values from the first gas pressure sensor and the second gas pressure sensor, and perform calibration control for calibrating the gas pressure detection value of the first gas pressure sensor through use of the gas pressure detection value of the second gas pressure sensor, in a state where the shutoff valve is closed and the on-off valve is open.

In performing calibration control for calibrating the gas pressure detection value of the first gas pressure sensor through the use of the gas pressure detection value of the second gas pressure sensor, the gas supply system according to this mode of the present disclosure introduces the fuel gas in the gas supply flow channel (hereinafter referred to as the gas in the flow channel) downstream of the shutoff valve in its closed state to the buffer tank in the branch flow channel that branches off from the gas supply flow channel, instead of introducing the gas in the flow channel to the gas consuming component. This buffer tank is not in a situation where the pressure thereof is higher than the consumption prescribed gas pressure at the time of consumption of fuel gas by the gas consuming component. Thus, the gas in the flow channel is swiftly delivered to the buffer tank, and as a result, the gas pressure detection value of the second gas pressure sensor also falls swiftly. As a result, the gas supply system according to this mode of the present disclosure makes it possible to swiftly complete calibration control of the first gas pressure sensor through the use of the gas pressure detection value of the second gas pressure sensor, through the shortening of the time to the timing when the gas pressure detection value of the second gas pressure sensor reaches the prescribed gas pressure.

In the gas supply system according to the aforementioned mode of the present disclosure, the control unit may be configured to perform the calibration control while the gas supply component is in operation and hence consumes the fuel gas, and the control unit may be configured to keep the shutoff valve closed and keep the on-off valve open, until a pressure of gas supplied to the gas consuming component becomes equal to a lower-limit gas pressure as the consumption prescribed gas pressure, after completion of the calibration control. In this manner, the fuel gas in the buffer tank can be consumed by the gas consuming component, before the detection value of the second gas pressure sensor reaches the lower-limit gas pressure as the consumption prescribed gas pressure. Therefore, the buffer tank can be rendered in a state where the internal pressure thereof is low. As a result, in subsequent calibration control of the first gas pressure sensor, the gas in the flow channel is delivered to the buffer tank within a shorter time. Thus, subsequent calibration control can be more swiftly completed.

In the gas supply system according to the aforementioned mode of the present disclosure, the control unit may be configured to perform the calibration control while the gas supply component is out of operation and hence does not consume the feel gas, and the control unit may be configured to keep the shutoff valve closed and keep the on-off valve open and cause the gas consuming component to consume the fuel gas in the buffer tank, when the gas consuming component starts operating after completion of the calibration control. In this manner, when the gas consuming component starts operating after calibration control of the first gas pressure sensor, the fuel gas delivered to the buffer tank during calibration control of the first gas pressure sensor can be delivered to the gas consuming component to be consumed. As a result, a fall in the internal pressure of the buffer tank and swift delivery of the gas in the flow channel to the buffer tank at the time of subsequent calibration control of the first gas pressure sensor are made possible, through the consumption of the fuel gas delivered to the buffer tank prior to the start of operation with the consumption of gas in the gas consuming component, by the gas consuming component. Thus, subsequent calibration control can be more swiftly completed. Besides, fuel economy can also be improved through the consumption of the fuel gas in the buffer tank resulting from the start of operation of the gas consuming component after calibration control of the first gas pressure sensor.

In the gas supply system according to the aforementioned mode of the present disclosure, the control unit may be configured to return the shutoff valve to an open state thereof and return the on-off valve to a closed state thereof, when the gas pressure detection value of the second gas pressure sensor reaches the lower-limit gas pressure as the consumption prescribed gas pressure. In this manner, even when the gas consuming component starts operating after calibration control of the first gas pressure sensor and the operation of the gas consuming component continues, fuel gas can be supplied to the gas consuming component in accordance with an operational situation of the gas consuming component, namely, a request for the consumption of gas in the gas consuming component, after the detection value of the second gas pressure sensor reaches the lower-limit gas pressure as the consumption prescribed gas pressure.

In the gas supply system according to the aforementioned mode of the present disclosure, the gas consuming component may be a fuel cell. In this manner, the necessity to operate the fuel cell is eliminated even if calibration control of the first gas pressure sensor is performed when the operation of the fuel cell is stopped, by refraining from delivering fuel gas to the fuel cell during the period of calibration control of the first gas pressure sensor, in addition to the already-mentioned effects such as the shortening of calibration control of the first gas pressure sensor and the like. As a result, the noise resulting from the operation of the fuel cell can be erased or suppressed.

Incidentally, the present disclosure can be realized in various aspects thereof. For example, the present disclosure can be realized in the mode of a method of supplying fuel gas to a gas consuming component, a vehicle having a gas supply system that supplies fuel gas to a fuel cell, or the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
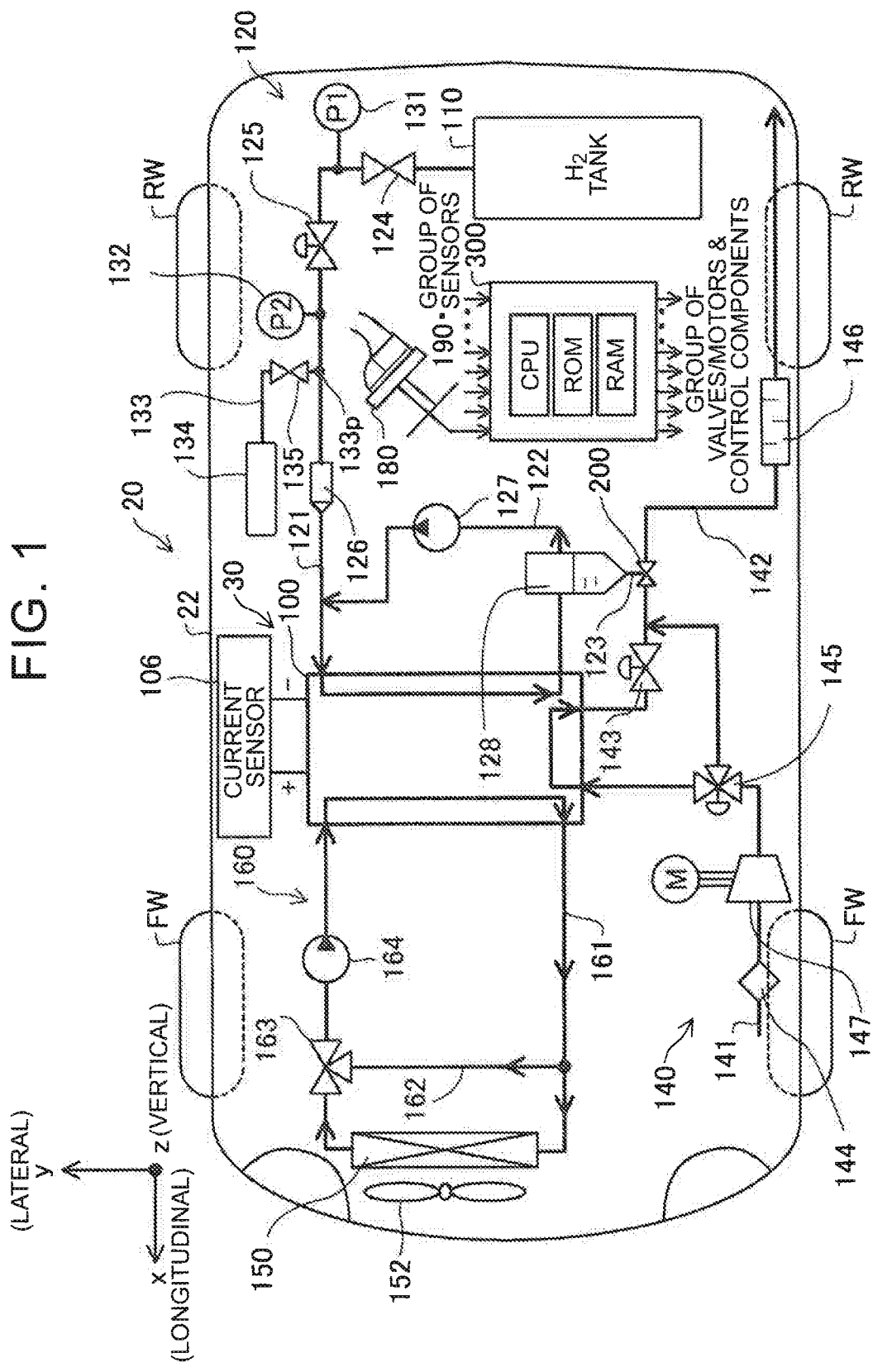
FIG. 1 is an illustrative plan view schematically showing a vehicle that is mounted with a fuel cell system.

FIG. 1 is an illustrative plan view schematically showing a vehicle 20 that is mounted with a fuel cell system 30. The vehicle 20 has a vehicle body 22 that is mounted with the fuel cell system 30. The fuel cell system 30 includes a fuel cell 100, a hydrogen gas supply system 120 including a hydrogen gas tank 110 as a gas supply system according to the first embodiment of the present disclosure, an air supply system 140 including a motor-driven compressor 147, a cooling system 160 including a radiator 150 and a fan 152, a group of sensors 190, and a control unit 300. The fuel cell system 30 supplies an electric power generated by the fuel cell 100 or an electric power with which a secondary battery (not shown) is charged, to loads including a motor (not shown) for driving front wheels. Incidentally, the fuel cell 100 is an exemplary gas consuming component in the present application.

The fuel cell 100 has a stack structure that is constituted by stacking battery cell units (not shown) as electric power generation units on one another, and is mounted beneath a vehicle floor between the front wheels FW and rear wheels RW. Then, the fuel cell 100 is supplied with hydrogen gas as fuel gas from the hydrogen gas supply system 120 that will be described later, is supplied with air as oxidation gas containing oxygen from the air supply system 140 that will be described later, generates an electric power by causing an electrochemical reaction between the hydrogen in hydrogen gas and the oxygen in air in the respective battery cell units, and drives the loads such as the motor and the like by the generated electric power. An electric power generation state of the fuel cell 100 is measured by a current sensor 106, and a measurement result thus obtained is output from the current sensor 106 to the control unit 300 that will be described later. In this case, the number of battery cell units that are stacked on one another to constitute the fuel cell 100 can be arbitrarily set in accordance with an output required of the fuel cell 100.

The hydrogen gas supply system 120 is equipped with a hydrogen gas supply flow channel 121 which extends from the hydrogen gas tank 110 storing hydrogen gas to the fuel cell 100 and through which hydrogen gas is supplied to the fuel cell 100, a hydrogen gas circulation flow channel 122 through which the unconsumed hydrogen gas (hereinafter referred to as anode off-gas as appropriate) discharged from the fuel cell 100 is circulated to the hydrogen gas supply flow channel 121, and a discharge flow channel 123 for discharging anode off-gas to the atmosphere. The hydrogen gas supply flow channel 121 is equivalent to the gas supply flow channel in the present application. Then, this hydrogen gas supply system 120 has the hydrogen gas supply flow channel 121 that is equipped, sequentially from the hydrogen gas tank 110 side, with a shutoff valve 124 for shutting off the hydrogen gas supply flow channel 121, a first gas pressure sensor 131, a pressure reducing valve 125, a second gas pressure sensor 132, and a hydrogen gas supply component 126. The first gas pressure sensor 131 is disposed between the pressure reducing valve 125 and the shutoff valve 124, detects a pressure of gas upstream of the pressure reducing valve 125, and outputs a detected value of the gas pressure (hereinafter referred to also as a detection value) to the control unit 300. The second gas pressure sensor 132 detects a pressure of gas downstream of the pressure reducing valve 125, and outputs a detected value of the gas pressure to the control unit 300.

The first gas pressure sensor 131 is a sensor with a wide pressure detection range, and is equipped with a sensor structure capable of detecting a storage prescribed gas pressure that is prescribed at the time of storage of hydrogen gas by the hydrogen gas tank 110, for example, a high gas pressure equal to 35 MPa. The pressure reducing valve 125 reduces a passing gas pressure of the hydrogen gas passing through the hydrogen gas supply flow channel 121 from a gas discharge pressure from the hydrogen gas tank 110. In concrete terms, this pressure reducing valve 125 reduces the passing gas pressure to a delivery prescribed gas pressure suited for the delivery of hydrogen gas to the fuel cell 100. The delivery prescribed gas pressure in this case is, as a matter of course, lower than the storage prescribed gas pressure of the hydrogen gas tank HO, and is substantially equal to or slightly higher than an upper-limit gas pressure as a consumption prescribed gas pressure that is prescribed in accordance with an electric power generation request at the time of consumption of hydrogen gas in the fuel cell 100. In the first embodiment of the present disclosure, the delivery prescribed gas pressure as a gas pressure reduced by the pressure reducing valve 125 is 0.9 to 1.0 MPa. Then, the supply amount of hydrogen gas at this delivery prescribed gas pressure to the fuel cell 100 is prescribed in accordance with an electric power generation request in the hydrogen gas supply component 126 that will be described later. The second gas pressure sensor 132 is a sensor with a narrower pressure detection range than that of the first gas pressure sensor 131, and is equipped with a sensor structure capable of detecting a gas pressure ranging from a gas pressure lower than the storage prescribed gas pressure equal to 35 MPa to a gas pressure (e.g., 3 MPa) higher than the already-described delivery prescribed gas pressure as the pressure reduced by the pressure reducing valve 125. The hydrogen gas supply component 126 is an injector, and delivers hydrogen gas to the fuel cell 100 in an amount of gas corresponding to an electric power generation request.

In addition, the hydrogen gas supply system 120 is equipped with a branch flow channel 133 that branches off from the hydrogen gas supply flow channel 121, between the pressure reducing valve 125 and the hydrogen gas supply component 126. An on-off valve 135 configured to open and close the branch flow channel 133, and a buffer tank 134 are provided in this branch flow channel 133, sequentially from a branch point 133p side thereof. That is, the buffer tank 134 is connected to the branch flow channel 133 via the on-off valve 135. This buffer tank 134 is a hollow resinous container that withstands the delivery prescribed gas pressure reduced by the pressure reducing valve 125, and is not in a situation where the pressure thereof is higher than the consumption prescribed gas pressure corresponding to the electric power generation request, through calibration control performed by the control unit 300 that will be described later. It is sufficient that this buffer tank 134 can be filled up with hydrogen gas with a volume corresponding to the flow channel volume of the hydrogen gas supply flow channel 121 downstream of the shutoff valve 124 at the delivery prescribed gas pressure (0.9 MPa) obtained by the already-mentioned pressure reducing valve 125. Thus, the tank capacity of this buffer tank 134 may be about 1. L. (liter).

The hydrogen gas supply system 120 that is equipped with the aforementioned hydrogen gas supply flow channel 121 undergoes the opening/closing of the flow channel by the shutoff valve 124 and pressure reduction at the pressure reducing valve 125, and supplies the hydrogen gas in the hydrogen gas tank 110 to the fuel cell 100 (more specifically, anodes (not shown) of the respective battery cell units). In this case, the hydrogen gas supply system 120 supplies hydrogen gas to the anodes of the fuel cell 100 at a flow rate obtained by summating a flow rate adjusted by the hydrogen gas supply component 126 downstream of the pressure reducing valve 125 and a circulation flow rate adjusted by a hydrogen gas circulation pump 127 in the hydrogen gas circulation flow channel 122. The supply amount of hydrogen gas is determined based on an operation of an accelerator 180 by the control unit 300 that will be described later, and corresponds to the load required of the fuel cell 100. The hydrogen gas circulation flow channel 122 is a fuel gas circulation flow channel through which the anode oft-gas discharged from the fuel cell 100 is circulated. The hydrogen gas circulation pump 127 is disposed in the hydrogen gas circulation flow channel 122 downstream of a gas-liquid separator 128 that will be described later.

In addition, the hydrogen gas supply system 120 is equipped with the gas-liquid separator 128 that is disposed in the hydrogen gas circulation flow channel 122. The gas-liquid separator 128 separates the produced water contained in the hydrogen gas passing through the hydrogen gas circulation flow channel 122 into gas and liquid, and stores them. Then, the hydrogen gas circulation pump 127 circulates the anode off-gas separated by the gas-liquid separator 128 to the hydrogen gas supply flow channel 121. The produced water separated by the gas-liquid separator 128 and the nitrogen contained in anode off-gas undergo the adjustment of the opening/closing of an on-off valve 200 for a discharge flow channel 123 that branches off from the gas-liquid separator 128, and are discharged to the outside atmosphere from a discharge flow channel 142. The discharge flow channel 123 is a produced water exhaust passage that extends from a component bottom portion of the gas-liquid separator 128. The on-off valve 200 is an exhaust valve that opens/closes the discharge flow channel 123 by being controlled by the control unit 300, and that discharges the produced water stored in the gas-liquid separator 128 from the discharge flow channel 123 as the discharge flow channel 123 opens.

The air supply system 140 is equipped with an oxygen supply flow channel 141 that extends to the fuel cell 100 via the compressor 147, and the discharge flow channel 142. The discharge flow channel 142 is an off-gas exhaust pipeline through which the unconsumed air (hereinafter referred to as cathode off-gas as appropriate) discharged from the fuel cell 100 is introduced to the outside and discharged to the atmosphere. The discharge flow channel 123 and the on-off valve 200 are disposed in the discharge flow channel 142. This discharge flow channel 142 is a flow channel that extends from a branch point from the fuel cell 100 with a substantially uniform flow channel diameter. The discharge flow channel 142 is arranged in an inclined manner, such that the vertical height thereof decreases as the distance therefrom to the downstream side decreases.

While supplying the air taken in from an opening end of the oxygen supply flow channel 141 via an air cleaner 144 to the fuel cell 100 (more specifically, cathodes (not shown) of the respective battery cell units) usually via the oxygen supply flow channel 141 after adjusting the flow rate of the air by the compressor 147, the air supply system 140 discharges cathode off-gas to the atmosphere via the discharge flow channel 142 at a flow rate adjusted by a discharge flow rate adjustment valve 143 in the discharge flow channel 142. In the case where air is thus supplied and cathode off-gas is thus discharged by the air supply system 140, the air supply system 140 supplies air by the compressor 147 after setting the discharge flow rate adjustment valve 143 in the oxygen supply flow channel 141 at a predetermined opening degree. As is the case with hydrogen gas, the supply amount of air in this case is also determined by the control unit 300 based on an operation of the accelerator 180, and corresponds to the load required of the fuel cell 100. Incidentally, the discharge flow rate adjustment valve 143 adjusts the flow rate and also adjusts the back pressure on the cathode side. Besides, the air supply system 140 is equipped with a three-way valve 145 upstream of the fuel cell 100, undergoes the control of this valve by the control unit 300, and discharges part of supplied air to the discharge flow channel 142. The discharge flow channel 142 is equipped with a muffler 146 therein, hence muffles noise, discharges the gas to the atmosphere, agglutinates the moisture contained in the gas by the muffler 146, and discharges the moisture and the gas together downstream of the muffler.

The cooling system 160 is equipped with a cooling medium circulation flow channel 161 for circulating a cooling medium from the radiator 150 to the fuel cell 100, a bypass flow channel 162, a three-way flow rate adjustment valve 163 at a flow channel merging point, and a cooling medium circulation pump 164. Then, this cooling system 160 circulates and supplies the cooling medium that has exchanged heat with the radiator 150 to the fuel cell 100 via the cooling medium circulation flow channel 161, introduces the cooling medium to an in-cell circulation flow channel (not shown) of the fuel cell 100, and cools the fuel cell 100 to a predetermined temperature. In this case, the drive amount of the cooling medium circulation pump 164, namely, the circulation supply amount of the cooling medium, and the radiator bypass flow rate according to the three-way flow rate adjustment valve 163 are determined by the control unit 300 based on a fuel cell temperature as a temperature detected by a temperature sensor (not shown) or an electric power generation situation detected by the current sensor 106. In the first embodiment of the present disclosure, a compound liquid of ethylene glycol and water is used as the cooling medium that is circulated and supplied in the cooling system 160.

The group of the sensors 190 includes various sensors required for running control and the like of the vehicle 20, including operation control of the fuel cell 100. In concrete terms, in addition to the first gas pressure sensor 131 and the second gas pressure sensor 132 in the hydrogen gas supply system 120, the group of the sensors 190 includes an accelerator sensor that detects an amount of depression operation of the accelerator 180, a fuel cell temperature sensor that detects a temperature of the fuel cell 100, a vehicle-width-direction acceleration sensor that detects an acceleration that is generated in the vehicle 20, concretely, an acceleration that is generated in a vehicle width direction as a result of the running of the vehicle along a curve or the inclination of the vehicle in the width direction thereof, a vehicle speed sensor, a steering wheel operation detection sensor, an ignition sensor, a range detection sensor that detects a drive range, a gas temperature sensor that detects an in-tank temperature of (a temperature of gas in) the hydrogen gas tank 110, and the like. Detection values of the respective sensors are output to the control unit 300.

The control unit 300 is configured as a microcomputer that is equipped with an input/output interface circuit to which the various sensors belonging to the group of the sensors 190 including the aforementioned current sensor 106 and control components such as the shutoff valve and the like are connected, a communication-related interface circuit that can be connected in a wireless manner to an outside map information network, and the like, as well as a CPU, a ROM, a RAM and the like that perform logical operations. The CPU with which the control unit 300 is equipped takes in charge of various kinds of control such as electric power generation control of the fuel cell 100, charge/discharge control of a secondary battery (not shown), calibration control of the first gas pressure sensor 131, and the like, by loading a control program stored in the ROM into the RAM and executing this control program.

Figure 2:
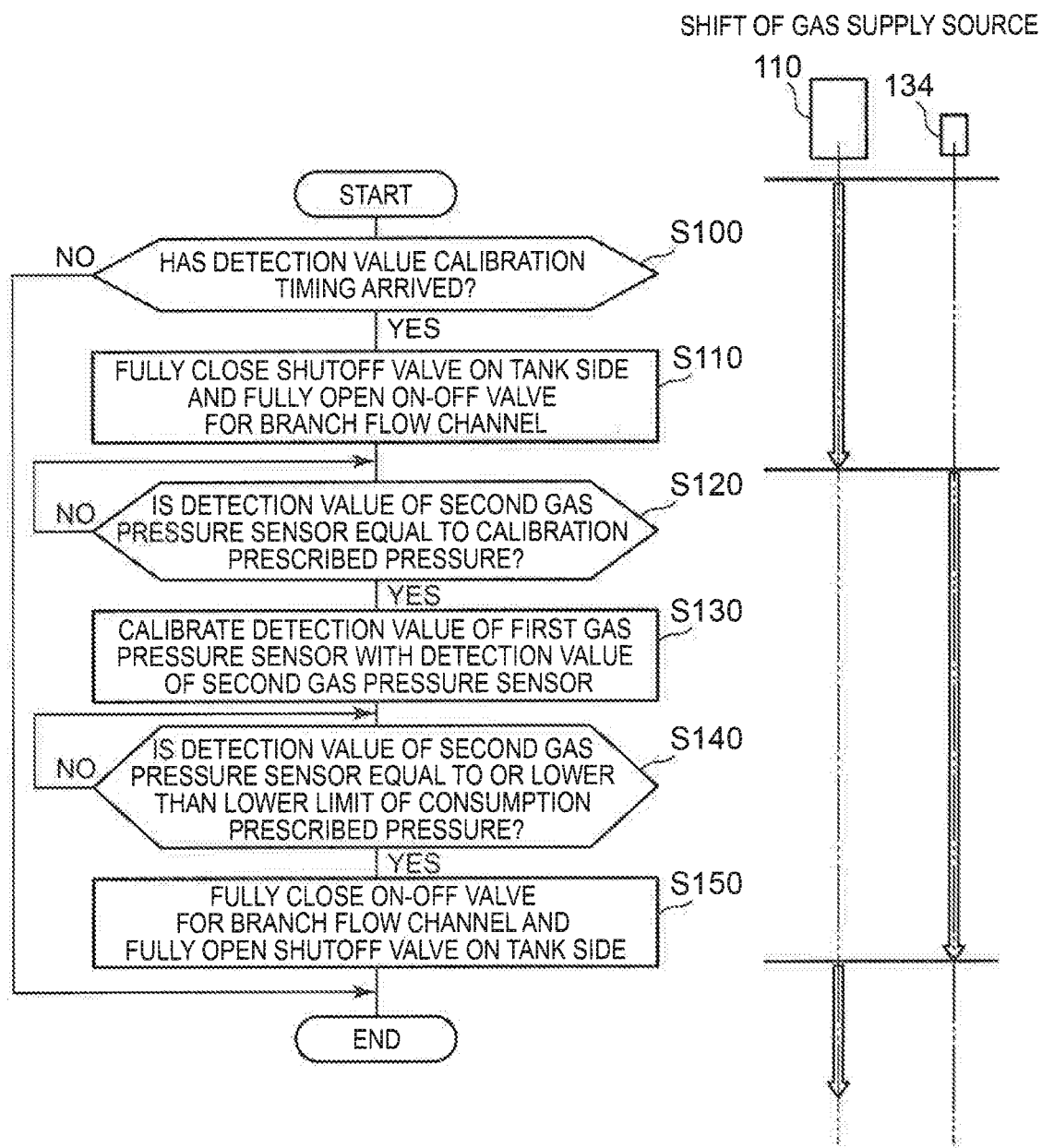
FIG. 2 is a flowchart representing the processing contents of calibration control according to the first embodiment of the present disclosure for calibrating a detection value of a first gas pressure sensor with a wide pressure detection range.

FIG. 2 is a flowchart representing the processing contents of calibration control according to the first embodiment of the present disclosure for calibrating a detection value of the first gas pressure sensor 131 with a wide pressure detection range, incidentally, in FIG. 2, the shift of a supply source of the hydrogen gas supplied to the fuel cell 100 is shown in conjunction with the shift of the processing of calibration control.

The control unit 300 repeatedly performs calibration control of the first gas pressure sensor 131 in a running process of the vehicle 20, namely, during an operation in which the fuel cell 100 consumes hydrogen gas, and first determines whether or not a timing for performing calibration control has arrived (step S100). The control unit 300 makes a determination on the timing of performance in step S100 by contrasting sensor detection values such as an outside air temperature detected by the outside air temperature sensor included in the group of the sensors 190, a temperature of the fuel cell detected by the fuel cell temperature sensor, an in-tank gas temperature detected by the gas temperature sensor, a gas pressure (a tank gas pressure) detected by the first gas pressure sensor 131, an elapsed time from the last calibration of the detection value of the first gas pressure sensor 131, and the like with a map stored in the ROM or using them for a prediction program. If the result of the determination in this step S100 is negative, namely, if it is determined in this step S100 that the timing for performing calibration control has not arrived, the control unit 300 temporarily ends the present routine.

If the result of the determination in step S100 is positive, namely, if it is determined in step S100 that the timing for performing calibration control has arrived, the control unit 300 sequentially performs the control of fully closing the shutoff valve 124 on the hydrogen gas tank 110 side and the control of fully opening the on-off valve 135 for the branch flow channel 133 in this order (step S110). In concrete terms, the control unit 300 performs the control of fully opening the on-off valve 135 for the branch flow channel 133, at a timing when the shutoff valve 124 fully closes the hydrogen gas supply flow channel 121. Calibration control of the first gas pressure sensor 131 according to the first embodiment of the present disclosure shown in FIG. 2 is performed in the running process of the vehicle 20 as described already, so in electric power generation operation control (not shown) of the fuel cell 100, the shutoff valve 124 is in its open state prior thereto. The shutoff valve 124 is fully closed in step S110 subsequently to a positive result of the determination in step S100 of calibration control according to the first embodiment of the present disclosure. On the other hand, the on-off valve 135 is not relevant to any kind of control in the running process of the vehicle 20, and hence is in its closed state prior thereto. The on-off valve 135 is fully opened in step S110 subsequently to a positive result of the determination in step S100 of calibration control according to the first embodiment of the present disclosure. In consequence, the supply source of the hydrogen gas supplied to the fuel cell 100 changes over as follows, upon valve control in step S110 subsequent to a positive result of the determination in step S100 of calibration control according to the first embodiment of the present disclosure.

The on-off valve 135 for the branch flow channel 133 is closed in the running process of the vehicle 20. Therefore, the buffer tank 134 has already been filled up with hydrogen gas at a lower-limit gas pressure as a consumption prescribed gas pressure that will be described later, prior to calibration control at the moment. That is, the buffer tank 134 is filled up with hydrogen gas in a situation where the pressure thereof is not higher than the consumption prescribed gas pressure. Then, the lower-limit gas pressure as this consumption prescribed gas pressure is lower than a delivery prescribed gas pressure after pressure reduction by the pressure reducing valve 125. The pressure of gas in the hydrogen gas supply flow channel 121 downstream of the shutoff valve 124 is the delivery prescribed gas pressure. In consequence, part of the hydrogen gas in the hydrogen gas supply flow channel 121 downstream of the shutoff valve 124 enters the buffer tank 134 and is stored therein, through the opening of the on-off valve 135 in step S110. Therefore, after valve control in step S110, the remaining hydrogen gas that is in the hydrogen gas supply flow channel 121 downstream of the shutoff valve 124 and that has not entered the buffer tank 134 is supplied to the fuel cell 100 by the hydrogen gas supply component 126. This hydrogen gas continues to be consumed by the fuel cell 100. Due to this consumption of gas and the entrance of hydrogen gas into the buffer tank 134, the gas pressure detected by the second gas pressure sensor 132 falls from the delivery prescribed gas pressure of the already-mentioned pressure reducing valve 125.

Subsequently to the aforementioned valve control, the control unit 300 determines whether or not the gas pressure detected by the second gas pressure sensor 132 has fallen to a prescribed gas pressure (step S120), and stands by until the gas pressure detected by the second gas pressure sensor 132 falls to the prescribed gas pressure. This prescribed gas pressure is a gas pressure that serves as a reference in performing calibration control of the first gas pressure sensor 131, and is prescribed as a gas pressure (e.g., 1.0 MPa) that is higher than the lower-limit gas pressure (e.g., 0.2 MPa) as the consumption prescribed gas pressure at which the fuel cell 100 consumes hydrogen gas and can continue electric power generation operation. If the result of the determination in step S120 is positive, namely, if it is determined in step S120 that the gas pressure detected by the second gas pressure sensor 132 has fallen to the prescribed gas pressure, the control unit 300 calibrates a detection value of the first gas pressure sensor 131 through the use of a detection value of the second gas pressure sensor 132 (the prescribed gas pressure) (step S130). This calibration control can be performed according to various methods, and is performed as follows in the first embodiment of the present disclosure. After the full closure of the shutoff valve 124 in step S110, hydrogen gas continues to be supplied from the hydrogen gas supply component 126 to the fuel cell 100. Therefore, the pressure of gas in the hydrogen gas supply flow channel 121 from the shutoff valve 124 to the pressure reducing valve 125 approaches the pressure of gas downstream of the pressure reducing valve 125. As time passes, the pressure of gas upstream of the pressure reducing valve 125 and the pressure of gas downstream of the pressure reducing valve 125 become equal to each other. Thus, in the first embodiment of the present disclosure, the prescribed gas pressure is defined such that the pressure of gas upstream of the pressure reducing valve 125 and the pressure of gas downstream of the pressure reducing valve 125 become equal to each other. In calibration control of the first gas pressure sensor 131, the detection value of the second gas pressure sensor 132 (the prescribed gas pressure) is regarded as the detection value of the first gas pressure sensor 131.

Subsequently to the aforementioned calibration of the detection value of the first gas pressure sensor 131, the control unit 300 determines whether or not the gas pressure detected by the second gas pressure sensor 132 has fallen to the lower-limit gas pressure (0.2 MPa) as the consumption prescribed gas pressure (step S140), and stands by until the gas pressure detected by the second gas pressure sensor 132 falls to the lower-limit gas pressure as the consumption prescribed gas pressure. If the result of the determination in this step is positive, namely, if it is determined in this step that the gas pressure detected by the second gas pressure sensor 132 has fallen to the lower-limit gas pressure as the consumption prescribed gas pressure, the control unit 300 sequentially performs the control of fully closing the on-off valve 135 for the branch flow channel 133 and the control of fully opening the shutoff valve 124 on the hydrogen gas tank 110 side (step S150), and ends the present routine. In concrete terms, the control unit 300 performs the control of fully opening the shutoff valve 124 at a timing when the on-off valve 135 fully closes the branch flow channel 133. Thus, the supply source of the hydrogen gas supplied to the fuel cell 100 returns to the hydrogen gas tank 110. Then, during a period preceding the return of the gas supply source to the hydrogen gas tank 110, the hydrogen gas in the buffer tank 134 is delivered to the fuel cell 100 and consumed. Therefore, the pressure of the buffer tank 134 falls to the lower-limit gas pressure as the consumption prescribed gas pressure. Incidentally, after the return of the supply source of the hydrogen gas supplied to the fuel cell 100 to the hydrogen gas tank 110, the hydrogen gas in the hydrogen gas tank 110 continues to be supplied to the fuel cell 100 through electric power generation operation control of the fuel cell 100 performed by the control unit 300.

The fuel cell system 30 having the hydrogen gas supply system 120 according to the first embodiment of the present disclosure described above calibrates the detection value of the first gas pressure sensor 131, which is required to detect a gas pressure with a wide detection range on the fuel cell 100 side, through the use of a detection value of the second gas pressure sensor 132 that is only required to detect a gas pressure with a narrow detection range downstream of the pressure reducing valve 125. Then, the fuel cell system 30 renders the buffer tank 134 in a situation where the pressure thereof is not higher than the consumption prescribed gas pressure, and performs the control of fully closing the shutoff valve 124 and the control of fully opening the on-off valve 135 in this order, prior to calibration control of the first gas pressure sensor 131 (step S110). Thus, the fuel cell system 30 introduces the hydrogen gas in the hydrogen gas supply flow channel 121 downstream of the shutoff valve 124 in its closed state to the buffer tank 134 in the branch flow channel 133 that branches off from the hydrogen gas supply flow channel 121, instead of introducing the hydrogen gas to the fuel cell 100 (steps S110 to S130). This buffer tank 134 is not in a situation where the pressure thereof is higher than the consumption prescribed gas pressure at the time when the fuel cell 100 consumes hydrogen gas. Thus, the hydrogen gas in the hydrogen gas supply flow channel 121 downstream of the shutoff valve 124 in its closed state is swiftly delivered to the buffer tank 134, and hence the detection value of the second gas pressure sensor 132 also falls swiftly. Moreover, hydrogen gas is supplied to the fuel cell 100 from the hydrogen gas supply component 126 in parallel with the delivery of the hydrogen gas in the flow channel to the buffer tank 134. Therefore, the detection value of the second gas pressure sensor 132 falls more remarkably. As a result, the fuel cell system 30 having the hydrogen gas supply system 120 according to the first embodiment of the present disclosure makes it possible to shorten the time to a timing when the detection value of the second gas pressure sensor 132 reaches the prescribed gas pressure, and thereby to swiftly perform calibration control of the first gas pressure sensor 131 through the use of the detection value of the second gas pressure sensor 132.

In performing calibration control of the first gas pressure sensor 131 through the use of the detection value of the second gas pressure sensor 132, the fuel cell system 30 allows the fuel cell 100 to consume the hydrogen gas in the hydrogen gas supply flow channel 121 downstream of the shutoff valve 124 in its closed state, without discharging the hydrogen gas to the outside. In consequence, the fuel cell system 30 having the hydrogen gas supply system 120 according to the first embodiment of the present disclosure makes it possible to increase the running distance of the vehicle 20 and improve fuel economy, through the effective use of the hydrogen gas in the flow channel.

In the running process of the vehicle 20, namely, during a gas consumption period in which hydrogen gas is delivered to the fuel cell 100 by the hydrogen gas supply component 126, the fuel cell system 30 performs the control of fully closing the shutoff valve 124 and the control of fully opening the on-off valve 135 in this order (step S110). When the detection value of the second gas pressure sensor 132 reaches the lower-limit gas pressure (0.2 MPa) as the consumption prescribed gas pressure, the fuel cell system 30 returns the shutoff valve 124 to its open state, and returns the on-off valve 135 to its closed state (steps S140 and S150). In consequence, before the detection value of the second gas pressure sensor 132 reaches the lower-limit gas pressure (0.2 MPa) as the consumption prescribed gas pressure as well, the hydrogen gas in the buffer tank 134 can be consumed by the fuel cell 100, so the internal pressure of the buffer tank 134 can be made low. As a result, the fuel cell system 30 having the hydrogen gas supply system 120 according to the first embodiment of the present disclosure makes it possible to deliver the hydrogen gas in the flow channel downstream of the shutoff valve 124 to the buffer tank 134 within a shorter time in subsequent calibration control of the first gas pressure sensor 131, and hence to more swiftly perform the subsequent calibration control as well.

In the fuel cell system 30, the buffer tank 134 that delivers hydrogen gas at the time of calibration control of the first gas pressure sensor 131 is a container with a tank capacity of about 1. L (liter). If the buffer tank 134 has more or less this size, there is no need to change the design or layout of peripheral components around the buffer tank 134 in mounting the buffer tank 134 on the vehicle body 22. Besides, it is sufficient for the buffer tank 134 to exhibit pressure resistance against a pressure as low as about 0.9 to 1.0 MPa. Thus, a general-purpose resinous container can be diverted as the buffer tank 134, and the cost can be reduced.

Figure 3:
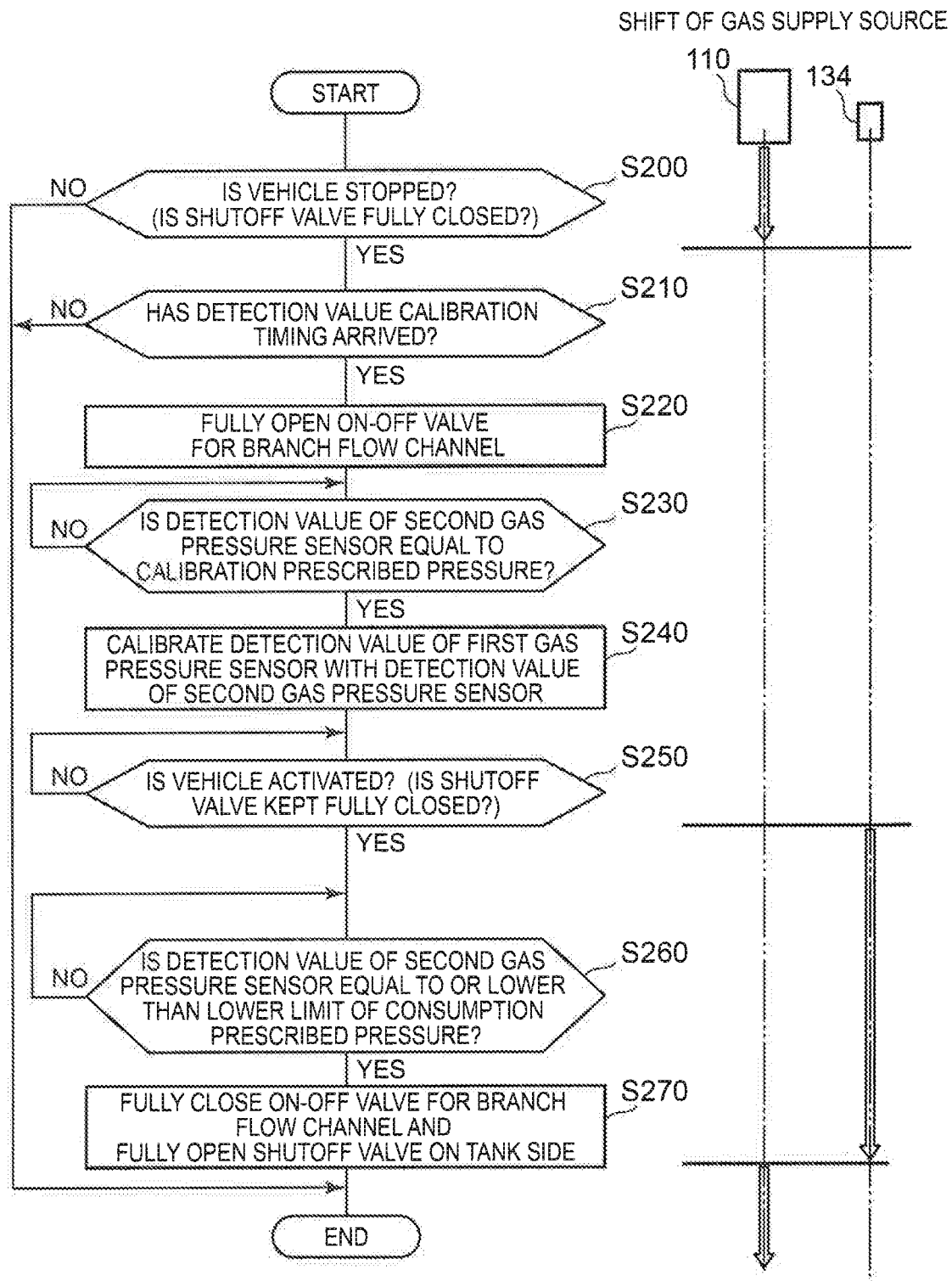
FIG. 3 is a flowchart representing the processing contents of calibration control according to the second embodiment of the present disclosure for calibrating the detection value of the first gas pressure sensor with the wide pressure detection range.

FIG. 3 is a flowchart representing the processing contents of calibration control according to the second embodiment of the present disclosure for calibrating the detection value of the first gas pressure sensor 131 with the wide pressure detection range. Incidentally, in FIG. 3 as well, the shift of the supply source of the hydrogen gas supplied to the fuel cell 100 is shown in conjunction with the shift of the processing of calibration control.

In calibration control of the first gas pressure sensor 131 according to this second embodiment of the present disclosure, the control unit 300 first determines whether or not the vehicle 20 is stopped (step S200). If the vehicle 20 is not stopped, the control unit 300 ends the present routine. When this vehicle 20 is stopped, an ignition switch is off. Therefore, the vehicle 20 is stopped during a non-operation period in which the fuel cell 100 does not consume hydrogen gas with no hydrogen gas delivered to the fuel cell 100 by the hydrogen gas supply component 126. In consequence, calibration control of the first gas pressure sensor 131 according to the second embodiment of the present disclosure is performed during the non-operation period of the fuel cell 100. Incidentally, it is determined in step S200 whether or not the vehicle 20 is stopped, based on outputs of the respective sensors included in the group of the sensors 190, such as the vehicle speed sensor, the ignition sensor, the drive range detection sensor, and the like. Besides, since the vehicle is stopped as a result of the turning off of the ignition switch, the shutoff valve 124 on the hydrogen gas tank 110 side is in its fully closed state through electric power generation operation control (not shown) of the fuel cell 100.

If the result of the determination in step S200 is positive, namely, if it is determined in step S200 that the vehicle 20 is currently stopped, the control unit 300 determines whether or not a timing for performing calibration control has arrived, as is the case with the already-described first embodiment of the present disclosure (step S210). If the result of the determination in this step S210 is negative, namely, if it is determined in this step S210 that the timing for performing calibration control has not arrived, the control unit 300 temporarily ends the present routine.

If the result of the determination in step S210 is positive, namely, if it is determined in step S210 that the timing for performing calibration control has arrived, the control unit 300 performs the control of fully opening the on-off valve 135 for the branch flow channel 133 (step S220). Incidentally, the on-off valve 135 is not relevant to any kind of control in the running process of the vehicle 20 as described already, and hence is in its closed state prior thereto. Then, as described already, the buffer tank 134 has already been filled up with hydrogen gas at the lower-limit gas pressure as the consumption prescribed gas pressure that is lower than the delivery prescribed gas pressure after pressure reduction by the pressure reducing valve 125, prior to calibration control at the moment. In consequence, through the opening of the on-off valve 135 for the branch flow channel 133 in step S220, the hydrogen gas in the hydrogen gas supply flow channel 121 downstream of the shutoff valve 124 enters the buffer tank 134 and is stored therein. Due to the entrance of hydrogen gas into this buffer tank 134, the gas pressure detected by the second gas pressure sensor 132 falls from the delivery prescribed gas pressure of the already-mentioned pressure reducing valve 125. Incidentally, the fact that the buffer tank 134 has already been filled up with gas at the lower-limit gas pressure as the consumption prescribed gas pressure will be described later.

Subsequently to the aforementioned valve control, the control unit 300 determines whether or not the gas pressure detected by the second gas pressure sensor 132 has fallen to the prescribed gas pressure (1.0 MPa), as is the case with the first embodiment of the present disclosure (step S230), and stands by until the gas pressure detected by the second gas pressure sensor 132 falls to the prescribed gas pressure. If the result of the determination in step S230 is positive, namely, if it is determined in step S230 that the gas pressure detected by the second gas pressure sensor 132 has fallen to the prescribed gas pressure, the control unit 300 calibrates the detection value of the first gas pressure sensor 131 through the use of the detection value of the second gas pressure sensor 132 (the prescribed gas pressure), as is the case with the first embodiment of the present disclosure (step S240).

Subsequently to the aforementioned calibration of the detection value of the first gas pressure sensor 131, the control unit 300 determines, based on the sensor outputs of the ignition sensor and the like, whether or not the vehicle 20 has been activated (step S250), and stands by until the vehicle 20 is activated. The vehicle is activated in response to a request for the consumption of hydrogen gas in the fuel cell 100 for electric power generation operation of the fuel cell 100. Therefore, the determination in step S250 is synonymous with a determination as to whether or not the fuel cell 100 has started operating after the completion of calibration control in step S240. Besides, the request for the consumption of hydrogen gas in the fuel cell 100 in this case is made for the stopped vehicle 20, and hence is a request for idling operation or a request for low-speed running after idling. Then, during a standby period prior to the activation of the vehicle 20, the control unit 300 does not perform any kind of control for the shutoff valve 124 in calibration control of the first gas pressure sensor 131 according to this second embodiment of the present disclosure. Therefore, the shutoff valve 124 remains fully closed due to electric power generation operation control (not shown) of the fuel cell 100, Incidentally, in calibration control of the first gas pressure sensor 131 according to the second embodiment of the present disclosure, the shutoff valve 124 may be controlled to be fully closed.

By the way, the on-off valve 135 for the branch flow channel 133 has already been fully opened through step S220. Therefore, if there is a request for the consumption of hydrogen gas in the fuel cell 100, hydrogen gas is supplied to the fuel cell 100 from the hydrogen gas supply component 126 through electric power generation operation control (not shown) of the fuel cell 100. In this case, the shutoff valve 124 is fully closed, and the on-off valve 135 is fully open, so hydrogen gas is supplied from the buffer tank 134. In consequence, the hydrogen gas in the buffer tank 134 is consumed by the fuel cell IOU, and the pressure of the buffer tank 134 becomes low. Incidentally, in calibration control of the first gas pressure sensor 131 according to the second embodiment of the present disclosure, the hydrogen gas supply component 126 may be controlled in response to a request for the consumption of hydrogen gas in the fuel cell 100.

If the result of the determination in step S250 is positive, namely, if it is determined in step S250 that the vehicle 20 has been activated based on the request for the consumption of hydrogen gas in the fuel cell 100, the control unit 300 determines whether or not the gas pressure detected by the second gas pressure sensor 132 has fallen to the lower-limit gas pressure (0.2 MPa) as the consumption prescribed gas pressure as is the case with the first embodiment of the present disclosure (step S260), and stands by until the gas pressure detected by the second gas pressure sensor 132 falls to the lower-limit gas pressure as the consumption prescribed gas pressure. If the result of the determination in this step is positive, namely, if it is determined in this step that the gas pressure detected by the second gas pressure sensor 132 has fallen to the lower-limit gas pressure as the consumption prescribed gas pressure, the control unit 300 sequentially performs the control of fully closing the on-off valve 135 for the branch flow channel 133 and the control of fully opening the shutoff valve 124 in this order, as is the case with the first embodiment of the present disclosure (step S270), and ends the present routine. Thus, after the vehicle is activated (after the result of the determination in step S250 becomes positive), the supply source of the hydrogen gas supplied to the fuel cell 100 changes over from the buffer tank 134 to the hydrogen gas tank 110. Then, during the period of activation of the vehicle prior to a changeover of the gas supply source to the hydrogen gas tank 110, the hydrogen gas in the buffer tank 134 is delivered to the fuel cell 100. In consequence, the pressure of the buffer tank 134 becomes as low as the lower-limit gas pressure as the consumption prescribed gas pressure, and is filled up with the unconsumed hydrogen gas at the lower-limit gas pressure as the consumption prescribed gas pressure. This is synonymous with the rendering of the buffer tank 134 in a situation where the pressure thereof is not higher than the consumption prescribed gas pressure, prior to subsequent calibration control of the first gas pressure sensor 131. Incidentally, after the supply source of the hydrogen gas supplied to the fuel cell 100 changes over to the hydrogen gas tank 110, the hydrogen gas in the hydrogen gas tank 110 continues to be supplied to the fuel cell 100, through electric power generation operation control (not shown) of the fuel cell 100 performed by the control unit 300.

The fuel cell system 30 having the hydrogen gas supply system 120 according to the second embodiment of the present disclosure described above also makes it possible to swiftly perform calibration control of the first gas pressure sensor 131 as described already, by introducing the hydrogen gas in the hydrogen gas supply flow channel 121 downstream of the shutoff valve 124 in its closed state to the buffer tank 134 instead of introducing the hydrogen gas to the fuel cell 100 (steps S220 to S240).

The fuel cell system 30 performs opening/closing control of the shutoff valve 124 and the on-off valve 135 (steps S200 and S220) and calibration control of the first gas pressure sensor 131 (steps S230 and S240) when the vehicle is stopped, namely, during the non-operation period in which no hydrogen gas is delivered to the fuel cell 100 by the hydrogen gas supply component 126. Then, even when the vehicle 20 is activated in response to a request for the consumption of gas in the fuel cell 100 after the completion of calibration control of the first gas pressure sensor 131, the fuel cell system 30 keeps the shutoff valve 124 closed and keeps the on-off valve 135 open, until the detection value of the second gas pressure sensor 132 reaches the lower-limit gas pressure (0.2 MPa) as the consumption prescribed gas pressure. In consequence, in response to a request for the consumption of gas in the fuel cell 100 after calibration control of the first gas pressure sensor 131, the hydrogen gas delivered to the buffer tank 134 during calibration control of the first gas pressure sensor 131 is delivered to the fuel cell 100 to be consumed (steps S260 and S270). As a result, the fuel cell system 30 having the hydrogen gas supply system 120 according to the second embodiment of the present disclosure makes it possible to lower the internal pressure of the buffer tank and swiftly deliver the gas in the flow channel to the buffer tank 134 at the time of subsequent calibration control of the first gas pressure sensor 131, through the consumption of the hydrogen gas delivered to the buffer tank 134 before a request for the consumption of gas in the fuel cell 100, by the fuel cell 100, and hence to more swiftly complete subsequent calibration control. Besides, the fuel cell system 30 having the hydrogen gas supply system 120 according to the second embodiment of the present disclosure also makes it possible to improve fuel economy, through the consumption of the hydrogen gas in the buffer tank in response to a request for the consumption of gas in the fuel cell 100 after calibration control of the first gas pressure sensor 131.

When the detection value of the second gas pressure sensor 132 reaches the lower-limit was pressure (0.2 MPa) as the consumption prescribed gas pressure, the fuel cell system 30 returns the shutoff valve 124 to its open state, and returns the on-off valve 135 for the branch flow channel 133 to its closed state (step S270). In consequence, even when the fuel cell 100 starts operating after calibration control of the first gas pressure sensor 131, the vehicle runs, and the fuel cell 100 continues to operate, hydrogen gas can be supplied to the fuel cell 100 in accordance with an operational situation of the fuel cell 100, namely, a request for the consumption of hydrogen gas in the fuel cell 100 resulting from the running of the vehicle, after the detection value of the second gas pressure sensor 132 reaches the lower-limit gas pressure (0.2 MPa) as the consumption prescribed gas pressure.

When the vehicle is stopped, namely, during a gas non-consumption period, the fuel cell system 30 performs calibration control of the first gas pressure sensor 131 (steps S230 and S240), and causes a fall in the detection value of the second gas pressure sensor 132 required for this calibration control, through the delivery of hydrogen gas to the buffer tank 134. In consequence, the fuel cell system 30 having the hydrogen gas supply system 120 according to the second embodiment of the present disclosure makes it possible to erase the noise resulting from operation of the fuel cell 100, because there is no need to operate the fuel cell 100 even if calibration control of the first gas pressure sensor 131 is performed when the vehicle is stopped, namely, during a non-operation period of the fuel cell 100.

The present disclosure is not limited to the above-mentioned embodiments of the present disclosure, the above-mentioned examples, or the above-mentioned modification examples, but can be realized in various configurations within such a scope as not to depart from the gist thereof. For example, the technical features in the embodiments of the present disclosure, the examples, and the modification examples corresponding to the technical features in the respective modes described in the section of the summary can be appropriately replaced or combined with one another, in order to achieve one, some or all of the above-mentioned effects. Besides, if the technical features are not described as indispensable in the present specification, they can be deleted as appropriate.

In the already-described second embodiment of the present disclosure, when the vehicle 20 is stopped, the ignition switch is off. However, when the vehicle 20 is stopped, the vehicle may be in an idling state (an idling stop state) after shifting from a running state to a stopped state. In this case, in step S200, the control of fully closing the shutoff valve 124 may be performed subsequently to a determination as to whether or not the vehicle is stopped, and a transition to subsequent step S210 may be made. Due to this control of fully closing the shutoff valve 124, hydrogen gas is stopped from being supplied from the hydrogen gas tank 110 in the idling stop state. Hydrogen gas is supplied to the fuel cell 100 from the buffer tank 134 in the idling stop state. In this manner, a fall in the internal pressure of the buffer tank and swift delivery of the gas in the flow channel to the buffer tank 134 at the time of subsequent calibration control of the first gas pressure sensor 131 are made possible through the consumption of the hydrogen gas in the buffer tank 134 during calibration control of the first gas pressure sensor 131 (steps S220 to S240). As a result, subsequent calibration control can be more swiftly completed. Besides, fuel economy can be improved through the consumption of the hydrogen gas in the buffer tank in the idling stop state.

In each of the already-described embodiments of the present disclosure, the on-off valve 135 is provided in the branch flow channel 133 extending to the buffer tank 134, hydrogen gas is delivered to the buffer tank 134, and hydrogen gas is supplied to the fuel cell 100 from the buffer tank 134. However, a flow channel changeover valve may be provided at the branch point 133$p$ of the branch flow channel 133. This flow channel changeover valve directly supplies hydrogen gas to the fuel cell 100 without the intermediary of the branch flow channel 133, in addition to the delivery of hydrogen gas to the buffer tank 134 and the supply of hydrogen gas to the fuel cell 100 from the buffer tank 134. This changeover of the valve is controlled h the control unit 300.

In each of the already-described embodiments of the present disclosure, the second gas pressure sensor 132 detects whether or not the pressure of gas in the flow channel downstream of the pressure reducing valve 125 has reached the lower-limit gas pressure (0.2 MPa) as the consumption prescribed gas pressure. However, other gas pressure sensors may be used.

In each of the already-described embodiments of the present disclosure, the vehicle 20 that is mounted with the fuel cell system 30 having the fuel cell 100 and the hydrogen gas supply system 120 has been described. However, the present disclosure may be applied to a stationary installation-type fuel cell electric power generation system that is equipped with the fuel cell 100 and the hydrogen gas supply system 120, in order to generate electric power for buildings.

In each of the already-described embodiments of the present disclosure, the fuel cell 100 is the gas consuming component. However, the present disclosure may be applied to a system that supplies fuel gas to a gas combustion-type internal combustion engine that burns the fuel gas supplied thereto.

What is claimed is:
1. A gas supply system that supplies a fuel gas to a gas consuming component, comprising:
 a gas supply flow channel that extends from a gas tank storing the fuel gas to the gas consuming component;

a pressure reducing valve that is provided in the gas supply flow channel and that is configured to reduce a pressure of gas passing through the gas supply flow channel to a delivery prescribed gas pressure;

a shutoff valve that is configured to shut off the gas supply flow channel upstream of the pressure reducing valve;

a first gas pressure sensor that is configured to detect a pressure of gas upstream of the pressure reducing valve;

a second gas pressure sensor that is configured to detect a pressure of gas downstream of the pressure reducing valve, wherein the second gas pressure sensor includes a sensor with a narrower pressure detection range than that of the first gas pressure sensor, and wherein the second gas pressure sensor is equipped with a sensor structure configured to detect a gas pressure ranging from a gas pressure lower than a storage prescribed gas pressure to a gas pressure higher than the delivery prescribed gas pressure, and wherein the delivery prescribed gas pressure is lower than the storage prescribed gas pressure and is substantially equal to or higher than an upper limit gas pressure as a consumption prescribed gas pressure that is prescribed in accordance with an electric power generation request when the fuel gas is consumed in the gas consuming component;

a gas supply component that is configured to supply the fuel gas to the gas consuming component from the gas supply flow channel;

a branch flow channel that branches off from the gas supply flow channel between the gas supply component and the pressure reducing valve;

a buffer tank that is connected to the gas supply flow channel via the branch flow channel and an on-off valve configured to open and close the branch flow channel and that is not in a situation where a pressure of the buffer tank is higher than the consumption prescribed gas pressure, wherein the on-off valve is connected to the buffer tank via the branch flow channel; and a control unit that is configured to:
 receive gas pressure detection values from the first gas pressure sensor and the second gas pressure sensor, and perform calibration control for calibrating the gas pressure detection value of the first gas pressure sensor through use of the gas pressure detection value of the second gas pressure sensor, in a state where the buffer tank has already been filled up with the fuel gas at a lower-limit gas pressure that is lower than the delivery prescribed gas pressure in a situation where the pressure of the buffer tank is not higher than the consumption prescribed gas pressure, the shutoff valve is closed and the on-off valve that is connected to the buffer tank via the branch flow channel is open.

2. The gas supply system according to claim 1, wherein
the control unit is configured to perform the calibration control while the gas supply component is in operation and hence consumes the fuel gas, and
the control unit is configured to keep the shutoff valve closed and keep the on-off valve open, until a pressure of gas supplied to the gas consuming component becomes equal to a lower-limit gas pressure as the consumption prescribed gas pressure, after completion of the calibration control.

3. The gas supply system according to claim 1, wherein
the control unit is configured to perform the calibration control while the gas supply component is out of operation and hence does not consume the fuel gas, and
the control unit is configured to keep the shutoff valve closed and keep the on-off valve open and cause the gas consuming component to consume the fuel gas in the buffer tank, when the gas consuming component starts operating after completion of the calibration control.

4. The gas supply system according to claim 3, wherein
the control unit is configured to return the shutoff valve to an open state of the shutoff valve and return the on-off valve to a closed state of the on-off valve, when the gas pressure detection value of the second gas pressure sensor reaches a lower-limit gas pressure as the consumption prescribed gas pressure.

5. The gas supply system according to claim 1, wherein the gas consuming component is a fuel cell.

* * * * *